June 28, 1949.  A. E. AFF  2,474,390
HOT DOG MACHINE
Filed March 27, 1946  4 Sheets-Sheet 1
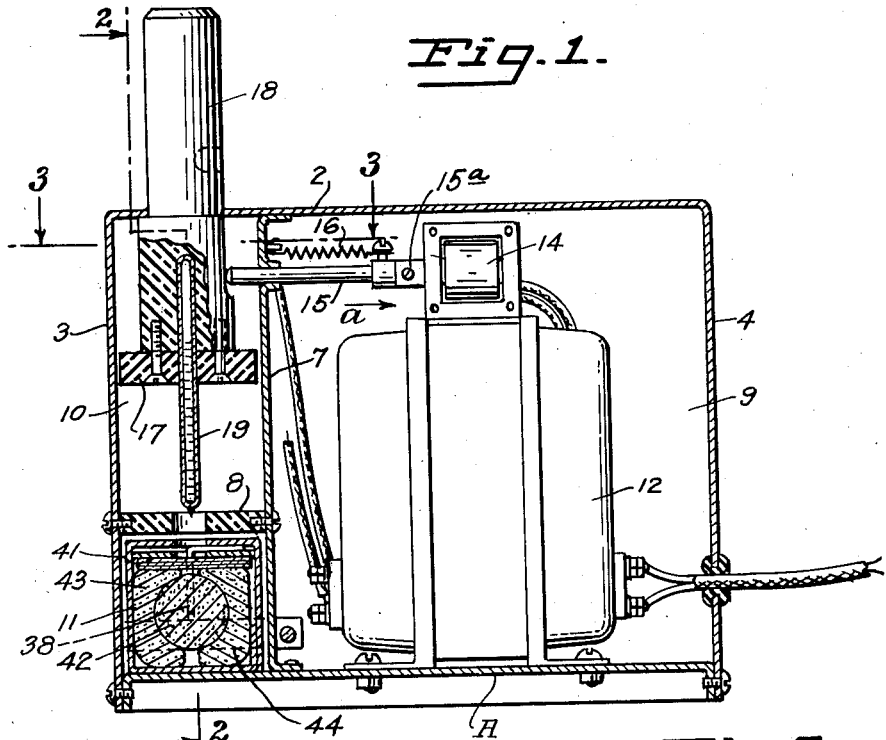
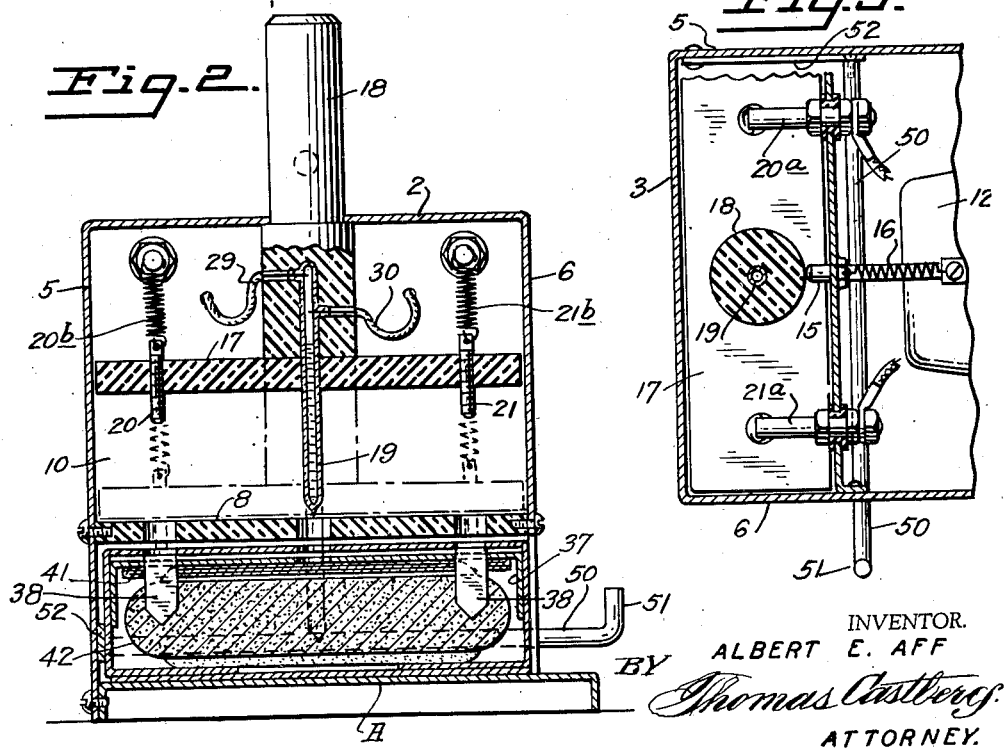
INVENTOR.
ALBERT E. AFF
BY Thomas Castberg
ATTORNEY.

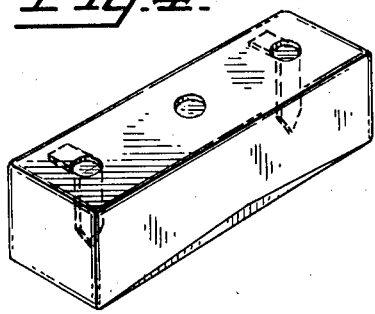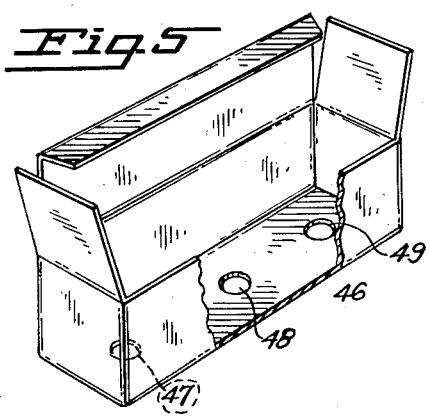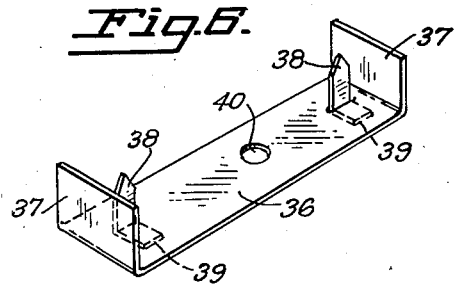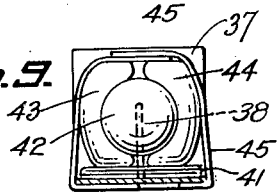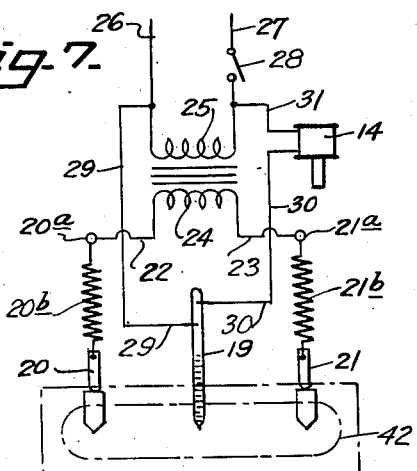
INVENTOR.
ALBERT E. AFF
BY Thomas Costberg
ATTORNEY.

June 28, 1949.　　　　　A. E. AFF　　　　　2,474,390
HOT DOG MACHINE

Filed March 27, 1946　　　　　　　　　　4 Sheets-Sheet 3

INVENTOR.
ALBERT E. AFF
BY Thomas Astberg
ATTORNEY

June 28, 1949.　　　　　A. E. AFF　　　　　2,474,390
HOT DOG MACHINE
Filed March 27, 1946　　　　　　　　　　　4 Sheets-Sheet 4
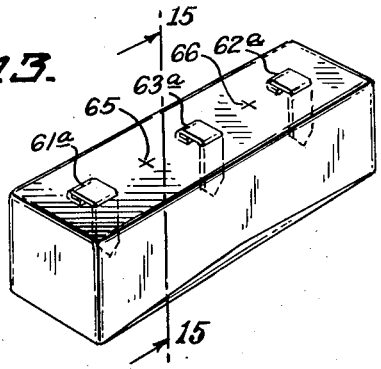
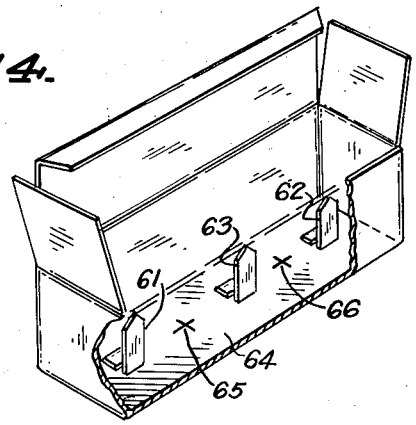
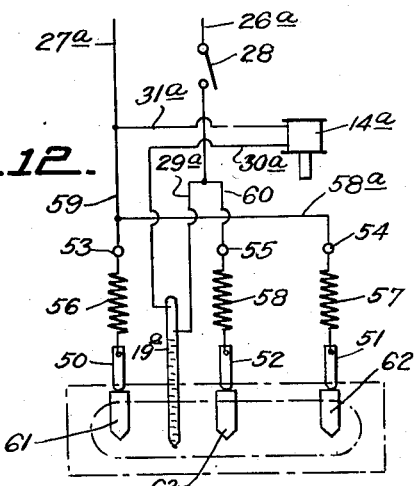
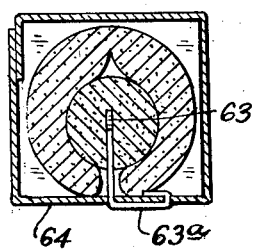
INVENTOR.
ALBERT E. AFF
BY Thomas Astlberg
ATTORNEY Patented June 28, 1949

2,474,390

UNITED STATES PATENT OFFICE 2,474,390

HOT DOG MACHINE

Albert E. Aff, South San Francisco, Calif.

Application March 27, 1946, Serial No. 657,475

5 Claims. (Cl. 219—19)

This invention relates to a package containing a split bun with a sausage between the split halves of the bun, and to a machine or apparatus for heating the sausage within the bun prior to serving the same.

The object of the present invention is to package food products such as a split bun with a sausage placed between the split halves of the bun in such a manner that the packaged food product may be made up in quantity and kept under sanitary conditions and refrigeration until ready for use, and to provide a mechanically operated machine or apparatus adapted for counter use whereby the proprietor or operator of a restaurant, or other place, may remove the packaged product from a refrigerator and introduce the packages one by one into the machine to heat them prior to serving.

The packaged product and the machine for heating the same is shown by way of illustration in the accompanying drawings, in which:

Figure 1 is a central vertical longitudinal section of the machine;

Figure 2 is a cross section taken on line 2—2 of Figure 1;

Figure 3 is a partial plan section taken on line 3—3 of Figure 1;

Figure 4 is a perspective view of the carton or package containing the sandwich;

Figure 5 is a perspective view of the carton before the sandwich is placed therein;

Figure 6 is a perspective view of the strip 36 which carries the electrodes 38;

Figure 7 is a diagrammatic view showing the wiring circuit of the machine;

Figure 8 is a plan view showing the split bun, together with the sausage, in position on the strip 36;

Figure 9 is a cross section taken on line 9—9 of Figure 8.

Figure 12 shows the wiring diagram of the modified machine;

Figure 13 is a perspective view of a modified carton showing it in closed position;

Figure 14 is a perspective view of the modified carton showing it open and one side wall broken away; and Figure 15 is a cross-section taken on line 15—15 of Figure 13.

Figure 10:
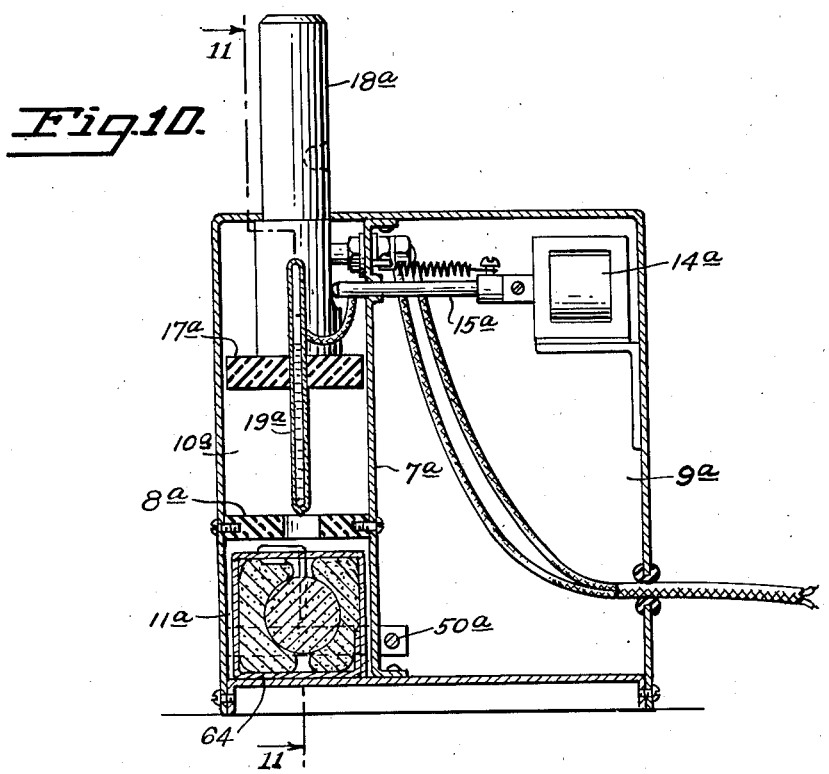
Figure 10 is a side elevation in section showing a modified form of machine.

Referring to the drawings in detail, and particularly Figs. 1 to 3 inclusive, A indicates a base member which forms a support for a housing consisting of a top plate 2, a front plate 3, a back plate 4 and side plates 5 and 6. Disposed within the housing is a vertically positioned partition plate 7 and also disposed within the housing is a horizontally positioned plate 8, said plates 7 and 8 dividing the housing into three compartments indicated at 9, 10 and 11.

Disposed within the compartment 9 is a transformer 12 and on top thereof is positioned a solenoid magnet 14 which actuates a latch 15 forming an extension of the movable core 15a of the magnet 14. The latch extends through and is guided in the partition plate 7. It is moved in the direction of arrow a when the magnet is energized and in the opposite direction by a spring 16.

Vertically movable in a compartment 10 is a head member 17 provided with a handle 18 which extends through and is guided by the top plate 2. The head member 17 carries a thermostatic tube 19 and a pair of contact 20 and 21 to which current is supplied from the secondary windings of the transformer in the following manner. Mounted in the partition plate 7 and insulated therefrom as shown in Figs. 2 and 3 are a pair of terminal members 20a and 21a and connecting said terminals with the contacts 20 and 21 are a pair of helical springs 20b and 21b which serve two functions first that of current conductors between the terminals and the contacts, and second that of springs which normally maintain the handle 18 and the head member 17 in the raised position shown in Figs. 1 and 2. The terminals are connected by wires 22 and 23 with the opposite ends of the secondary winding 24 of the transformer (see Fig. 7), while the primary winding 25 of the transformer is connected with a suitable source of current supply through wires 26 and 27. Any suitable switch such as shown at 28 may be placed in the circuit to energize the transformer.

The thermostat indicated at 19 is a glass tube partially filled with mercury. Two wires 29 and 30 are connected with the tube and the primary circuit in such a manner that when the mercury within the tube is heated to a predetermined temperature, the mercury will expand and rise a sufficient distance in the tube to close the circuit between them as shown in Fig. 2. Wire 30 is connected with one terminal of the solenoid magnet, the other terminal being connected through wire 31 with the wire 27 of the primary circuit. Hence, when the thermostat closes the circuit between the wires 29 and 30, magnet 14 will be energized and latch 15 is actuated as will hereinafter be described.

The food product to be heated by the apparatus or machine heretofore described is commonly known as hot dog sandwiches. The product consists of a split bun between the two halves of which is placed a wiener or sausage and any condiment desired such as mustard, horse radish, etc. A food product of this character must be made up in quantity if particularly intended for vending machines of one type or another, and it must be handled in the most sanitary way possible. For these reasons each sandwich is placed within a carton B (see Figs. 4 to 9 inclusive). This carton may be made in any suitable manner and should be long and large enough to receive the sandwich.

In order to facilitate wrapping and packaging of the sandwich and to promote sanitation, a cardboard strip 36 (see Fig. 6) with upturned ends 37 is employed. This strip carries two electrodes made of any suitable metal such as sheet iron or the like. Each electrode has a prong portion 38 and a base or terminal end 39. These electrodes are punched through the strip to assume the position shown in Fig. 6, and a hole 40 is punched in the center of the strip. This hole forms a passage for the thermostat, as will hereinafter be described.

In actual practice the food product or sandwich is prepared and packaged in the following manner. A folded tissue paper napkin 41 is first pressed over the prongs of the electrodes and forced down and over them to lie flat on the upper surface of the strip 36. A cooked or otherwise prepared sausage 42 is next pushed down over the prongs to rest on the napkin. The two halves 43 and 44 of a bun are then placed on each side of the sausage to enclose it and a paper band 45 is finally wrapped around the whole assembly to prevent the two halves of the bun from falling off the strip. The whole assembly is now placed in the open carton shown in Fig. 5 with the strip 36 contacting the bottom 46 of the carton. This bottom by the way has three holes punched therein and indicated at 47, 48 and 49, hence when the assembly is placed in the carton, hole 40 formed in the strip will register with the hole 48 in the bottom of the carton, while the contact ends 39 of the electrodes will register with the respective holes 47 and 49 formed in the bottom of the carton. After the sandwich has been placed within the carton as described, the end flaps and cover of the carton are closed thereby completing the packaging of the sandwich.

The packaging of the sandwiches should preferably take place in a plant or factory especially prepared therefor and should be distributed from this plant to vending locations from where they are finally sold.

It should be obvious that every restaurant, coffee shop or place serving the sandwiches will require one or more machines of the type shown in Figs. 1, 2 and 3. These machines are ornamental in appearance and may be placed to advantage on a counter or wherever convenient. When an order is received, the package is pushed endwise into the compartment 11 of the machine, care being taken that the carton or package is turned so that the bottom section having the holes 47, 48 and 49 formed therein faces upwardly. After insertion, the operator closes the switch 28 to energize the transformer and then merely depresses the handle 18 which, when depressed, will remain in that position as it will be retained by the latch 15 until released by said latch. When the handle is depressed, the thermostatic tube 19 will enter the carton and the sausage through the registering openings 40 and 48 of the carton and the contacts 20 and 21 will at the same time engage the terminal ends of the electrodes 38, thus closing a circuit through the sausage and the secondary winding of the transformer. The electric current flowing through the sausage causes rapid heating thereof and at the same time by conduction heats the thermostatic tube which is embedded in the sausage. The mercury therein will of course expand as the heat increases and when a predetermined temperature is reached, a circuit will be closed through the wires 29 and 30, thereby energizing the solenoid magnet 14 causing it to retract the latch 15. When this is released, springs 20b and 21b will retract or raise the head member 17 and handle 18, thereby returning them to their normal elevated position and at the same time breaking the circuit through the sausage and the secondary winding of the transformer. When the head and handle are retracted, the thermostatic tube is also retracted, but as it perforates the folded napkin and is pulled back through the perforated napkin, it will be wiped and cleaned after each operation.

The carton or package may now be removed from the compartment 11. To facilitate such removal, a rod 50 is provided. It has a handle 51 on its outer end and on its inner end a pusher plate 52 which extends into the compartment 11. By exerting a slight pull on the handle, the carton containing the sandwich is partially projected and may thus be readily removed, and when removed, may be handed directly to the customer who will open the carton and remove the sandwich from the strip and the carton.

From the foregoing it should be obvious that the food product, to wit, the split bun with the sausage placed between the two halves of the bun, is handled in a most sanitary manner as human hands do not touch the food product except in the central plant where the sandwiches are prepared and packaged. From then on the sandwich is enclosed by the carton and human hands cannot touch or contact it. After it has been heated in the machine and removed therefrom, the only person who will contact it will be the customer who is going to eat it as he or she removes the sandwich from the carton, etc. The carton together with the strip 36 which carries the electrodes 38 is thrown away never to be used again. This is important as the electrodes 38 should not be used more than once as they have a tendency to become coated with the food product and if used over and over again would soon become unsanitary.

Figure 11:
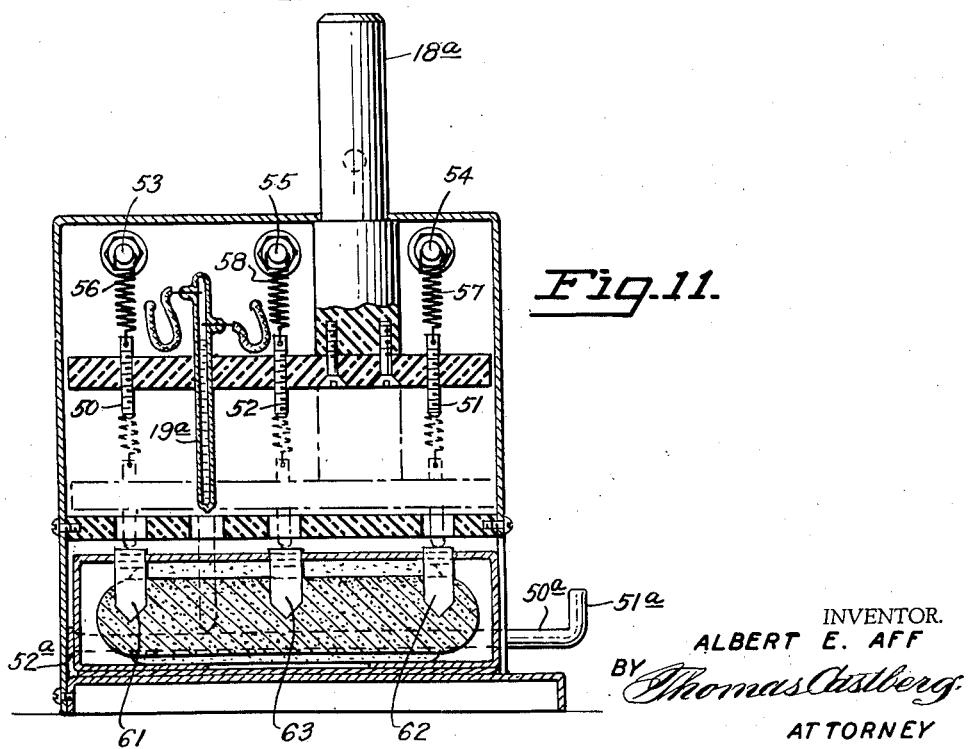
Figure 11 is a cross section taken on line 11—11 of Figure 10.

A modified form of the machine and the food package is shown in Figures 10 to 15. In this machine the same type of housing is employed and it is divided into three compartments indicated at 9a, 10a and 11a by partition plates 7a and 8a. The same type of cross head 17a and handle 18a is employed but it differs to the extent that the cross head carries three contact members, one at each end as indicated at 50 and 51, and one in the center as indicated at 52. These contacts are connected with terminal members 53, 54 and 55 through springs 56, 57 and 58. The same type of thermostat tube 19a is carried by the cross-head, one terminal of said tube being connected with one side 26a of the electric current supply by a wire 29a and the other terminal of the tube being connected with one terminal of a solenoid magnet 14a through a wire 30a, while the other terminal of the solenoid magnet is connected with the other side 27a of the current supply by a wire 31a, all as previously described.

The terminals 53 and 54 are connected by a common wire 58a and this wire is connected by a wire 59 with wire 27a, and terminal 55 is connected with wire 26a through wire 60. A carton or package ejector 52a with its rod 50a and handle 51a is the same as previously described and operates in the same manner.

A modified form of carton is required with the modified machine and this carton is shown in Figs. 13, 14 and 15. This carton is provided with three electrodes one at each end as indicated at 61 and 62 and one at the center as indicated at 63. These electrodes are secured to the bottom section 64 of the carton in the manner shown so that each electrode presents a pointed prong which extends into the carton and an exterior terminal. The exterior terminals presented by the electrodes are best shown in Fig. 13 and are shown at 61a, 62a and 63a. It should also be noted that two cross cuts are formed in the bottom section 64 of the carton as indicated at 65 and 66. The purpose of these cross cuts will hereinafter be described.

In actual operation when preparing the food package or carton, a wiener or sausage is placed in the carton and pushed down over the prongs or the electrodes 62, 63 and 61, and a split bun is placed one-half on each side of the sausage after which the cover portion of the carton is closed.

When the carton is to be placed in the machine, it is inserted in chamber 11a and when inserted, care must be taken that the bottom side 64 is turned uppermost so that the terminals 61a, 62a and 63a will be in the position where an electric circuit through them may be closed. After insertion of the carton, the handle 18a is depressed, and when depressed, is secured by the latch 15a. In the depressed position of the cross head contacts 50, 51 and 52 will engage the terminals 61a, 62a and 63a of the carton and will thus close an electric circuit through the electrodes 61, 62 and 63, which are embedded in the sausage. This circuit can best be traced by reference to Fig. 12. If switch 28 is closed, current will flow through wires 58 and 59 and through the terminals 53 and 54, then through the springs 56 and 57 and the contacts 50 and 51 which engage the terminals of the electrodes 61 and 62. The current will then flow through the sausage to the central electrode 63, then out through said electrode and the contact 52, then through spring 56, terminal 55, wire 60 and feed wire 26a, thus completing the circuit. The current flow through the sausage causes rapid heating thereof and when a predetermined temperature is reached, the mercury in the thermostat tube 19a closes the circuit through wires 29a and 30a, thereby energizing the solenoid magnet 14a causing this to retract the latch 15a. When this is released, springs 56, 57 and 58 will retract and elevate the cross head and the heating circuit through the sausage will accordingly be broken. The carton containing the sausage or sandwich may now be removed by grasping and pulling on the ejector handle 51a. It may then be handed to the purchaser for opening and removal of the sandwich.

It was previously stated that two cross cuts 65 and 66 were formed on the bottom 64 of the carton, and it was also previously stated that when the carton is inserted in the chamber 11 of the machine, that care must be taken that the bottom of the carton is turned uppermost. With the bottom turned uppermost, either end may be inserted in chamber 11, and as the thermostat tube is off center with relation to the handle, it will enter the carton when the cross-head is depressed through one of the cross slots 65 or 66, whichever happens to be in register with the thermostat tube. In other words the cross cuts form a weakened portion in the bottom of the carton so that the thermostat tube may readily enter when the cross head is depressed. This weakened or cross-cut portion also serves to wipe or clean the thermostat tube when it is removed, thus maintaining it in a sanitary condition, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. A package for a food product comprising an insulating carton having a pair of electrodes disposed one adjacent each end thereof, each electrode comprising a prong extending into the carton in position to engage a product therein and a terminal member adapted to be engaged on the exterior of the carton.

2. In a machine for heating sausage sandwiches enclosed by a carton, a housing having a compartment formed therein for the reception of a carton containing a sandwich, said carton having a pair of electrodes which extend into the sausage, a head member mounted in the housing and movable to and away from a carton placed therein, a pair of contacts carried by the head member, said contacts being connected with a source of electric current supply, a tubular formed thermostat element carried by the head member, means for moving the head member from a normal position to a position where the thermostat element will enter the carton and the sausage and the contacts on the head member will engage the electrodes in the carton, said engagement closing an electric circuit through the sausage, a latch to retain the head member when moved to said position, means actuated by the thermostat element when current flow through the sausage has heated the sausage and the thermostat element to a predetermined temperature for releasing the latch, and means for returning the head member together with its contacts and thermostat element to normal position.

3. A food product package for use with a pair of electrical conductors comprising a carton adapted to contain a sausage, a pair of prongs supported by said carton in a position to pierce a sausage therein, contact terminals supported by said carton in a position to abut said conductors, and an electric conductor connecting said prongs and said terminals.

4. A packaged food product comprising a strip of insulating material having a pair of spaced electrodes thereon, each electrode comprising a prong extending into the food product and a contact portion exterior thereof, and an outer member enclosing said strip and impaled food product.

5. In combination, a mechanism for heating a product in a package and a package for the said product; said mechanism comprising a frame, a pair of spaced contacts on said frame, an electric heating circuit connected to and open between said contacts, and fixed means on said frame defining an open-sided compartment for guiding and holding said package in a predetermined position relative to said contacts; said package comprising a carton having a pair of electrodes disposed one adjacent each end thereof, each electrode comprising a prong extending into the carton in position to engage a product therein and a terminal member adapted to be engaged on the exterior of the carton; the said spaced contacts being so positioned relative to said compartment as to engage said terminal members when said package is in said predetermined position.

ALBERT E. AFF.

REFERENCES CITED

The following references are of record in the file of this patent:

UNITED STATES PATENTS

| Number | Name | Date |
|---|---|---|
| 267,685 | Fowler | Nov. 21, 1882 |
| 1,830,246 | Sanford | Nov. 3, 1931 |
| 2,130,533 | Barton | Sept. 20, 1938 |
| 2,139,690 | McConnell et al. | Dec. 13, 1938 |
| 2,287,956 | Aff | June 30, 1942 |
| 2,390,277 | Simpkins | Dec. 4, 1945 |